United States Patent [19]

Rudert et al.

[11] 3,896,489

[45] July 22, 1975

[54] ELECTRONIC TAPE EDITING EQUIPMENT

[75] Inventors: Frithjof Rudert, Darmstadt-Eberstadt; Rolf Muller, Seeheim; Dietmar Gornott, Darmstadt-Arheilgen, all of Germany

[73] Assignee: Robert Bosch G.m.b.H., Stuttgart, Germany

[22] Filed: Dec. 19, 1973

[21] Appl. No.: 426,360

[30] Foreign Application Priority Data

Dec. 30, 1972 Germany .......................... 2264326

[52] U.S. Cl. .......................... 360/14; 360/62; 360/72

[51] Int. Cl. .. H04n 5/78; G11b 27/02; G11b 27/32

[58] Field of Search .............. 360/13, 14, 7, 61, 62, 360/64, 69, 72

[56] References Cited

UNITED STATES PATENTS

| | | | |
|---|---|---|---|
| 3,084,215 | 4/1963 | Bounsall | 360/14 |
| 3,180,930 | 4/1965 | Bounsall | 360/62 |
| 3,538,265 | 11/1970 | Keeler | 360/7 |
| 3,733,444 | 5/1973 | French, Jr. | 360/13 |

*Primary Examiner*—Raymond F. Cardillo, Jr.
*Attorney, Agent, or Firm*—Michael S. Striker

[57] ABSTRACT

A video tape recorder has an erase head positioned at a predetermined distance ahead of the record/-playback head along the transport path of the tape. A first additional head is energized simultaneously with the erase head to leave a mark on an auxiliary track. The mark is sensed by a second additional head spaced from the first additional head by a distance equal to the distance between the erase and record/-playback heads. The sensed mark causes the record/-playback head to be switched to the recording circuit thereby causing the recording to begin at the start of the taped portion erased by the erase head.

12 Claims, 3 Drawing Figures

ELECTRONIC TAPE EDITING EQUIPMENT

BACKGROUND OF THE INVENTION

This invention relates to an arrangement for the electronic cutting of video tapes. In particular, it relates to an arrangement wherein the tape recorder set up has an erase head which is positioned a predetermined distance along the length of the tape from one or more record/playback heads.

The term "electronic cutting" or "electronic editing" used herein refers to the recording on a single tape of individual scenes previously separately recorded. It differs from the process of film cutting in that no actual physical cutting takes place as is the case for film but the scenes which are to be arranged in a determined sequence are recorded in the correct time sequence on a single magnetic tape. Special requirements exists for the electronic cutting of video tapes. Thus, to insure that the final tape can be played back without interspersed gaps or disturbance, it is necessary that the sequence of vertical and horizontal synchronizing pulses at the cutting location is not interrupted. Further, it is required that the individual scenes follow one another without a gap on the tape. The latter problem requires particular attention when the recording equipment has an erase head which is physically located a predetermined distance along the length of a tape away from the record/playback head.

The time required for a particular point on the tape to travel between the erase head and the record/playback head is relatively constant. In the equipment herein considered, to which of course this invention is in no way limited, this time is approximately 0.6 seconds. Thus in known equipment, a delay circuit is provided which causes a control signal which energizes the erase head to be delayed by a specific amount so that the record/playback heads are switched to the record position at the point on the tape at which the erasure began. Of course this type of arrangement has the disadvantage that small variations in tape speed are not considered and that the delay circuit in itself may not be sufficiently stable. Thus errors may arise. These errors are prevented in another arrangement which causes control pulses to be counted starting with the energization of the erase head. Since the distance between the erase head and the record/playback head or heads is fixed, it is of course certain that after a predetermined number of control pulses that place on the tape at which the erasure began will have reached the erase/playback head. This arrangement is however relatively expensive and not readily adapted to different television systems.

SUMMARY OF THE INVENTION

It is an object of the present invention to furnish a simple arrangement for causing individual scenes to be recorded in sequence on a single tape without creating discontinues in the so recorded sequence.

The present invention resides in tape recorder equipment wherein tape is transported along a predetermined path and wherein an erase head is positioned a predetermined distance from read/record head along said predetermined path. It comprises additional recording means mounted in operative proximity to said tape for recording a marker signal on said tape when energized. It further comprises additional playback means mounted in operative proximity to said tape at a distance from said recording means corresponding to said predetermined distance, for sensing said marker signal and furnishing a timing signal in response thereto. The tape recorder equipment further has recording circuits and playback circuits. Means are provided for energizing said additional recording means and said erase head in response to an externally applied record signal. A marker signal is thereby created on the tape. The marker signal is sensed by the additional playback means and furnishes a timing signal. The timing signal is applied to switch means which switch the record/playback head to the recording circuitry in response thereto.

The present invention is particularly suitable for video recording apparatus which operates with tracks perpendicular to the tape advance and normally operates with four recording heads. It is further useful in apparatus utilizing one or two heads and operating with tracks transverse to the tape advance.

In a preferred embodiment of the invention, the marker signal is recorded on auxiliary tracks of the tape as for example the sound track or any of the control or timing code tracks and with either an amplitude or a frequency outside of the corresponding ranges normally recorded on the auxiliary track.

In a further preferred embodiment, when the tape recorder equipment uses tracks perpendicular to the tape advance, the marker signal may be recorded in a lengthwise track within the region of the video tracks. In either of these embodiments no additional track is required. Other recorded information is not disturbed by the addition of the marker signal of the present invention.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
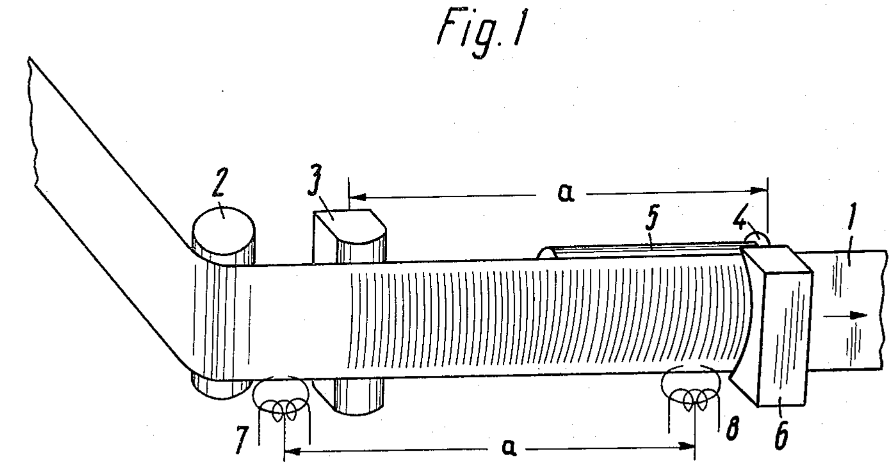
FIG. 1 is a schematic diagram showing one embodiment of the present invention.

A preferred embodiment of the present invention will now be described with reference to the drawing.

FIG. 1 shows the tape 1 of magnetic tape recorder equipment. The tape is transported in the direction indicated by the arrow. Also shown are a guide roller 2, the erase head 3, and a head wheel arrangement which, in recording equipment which operates in accordance with the perpendicular track principle, comprises a head wheel 4 along whose circumference are mounted four magnetic heads, the head wheel motor 5 and head shoe 6.

In accordance with the present invention two additional heads 7 and 8, herein referred to as, respectively, additional recording means and additional playback means are provided. The distance between these two additional heads, marked a in the drawings corresponds to, and is substantially equal to, the distance between the erase and record/playback heads of the recorder equipment. The latter distance is herein referred to as the predetermined distance and is also marked a in FIG. 1.

Assume now that it is desired to add a second scene to a first scene already recorded on the tape, without creating a gap on the tape. Thus the erase head 3 is energized at the instant at which the first scene is ended. Simultaneously, a marker signal is applied by means of head 7. In order that the two scenes follow directly on the tape, it is required that head or heads 4 will be switched from playback to record when the last track of the first scene has just passed the record/playback heads 4. However at this point in time the marker signals recorded by head 7 just reach head 8 so that head 8 furnishes a signal, herein referred to as a timing signal which is utilized to switch head 4 from the recording circuitry to the playback circuitry.

Figure 2:
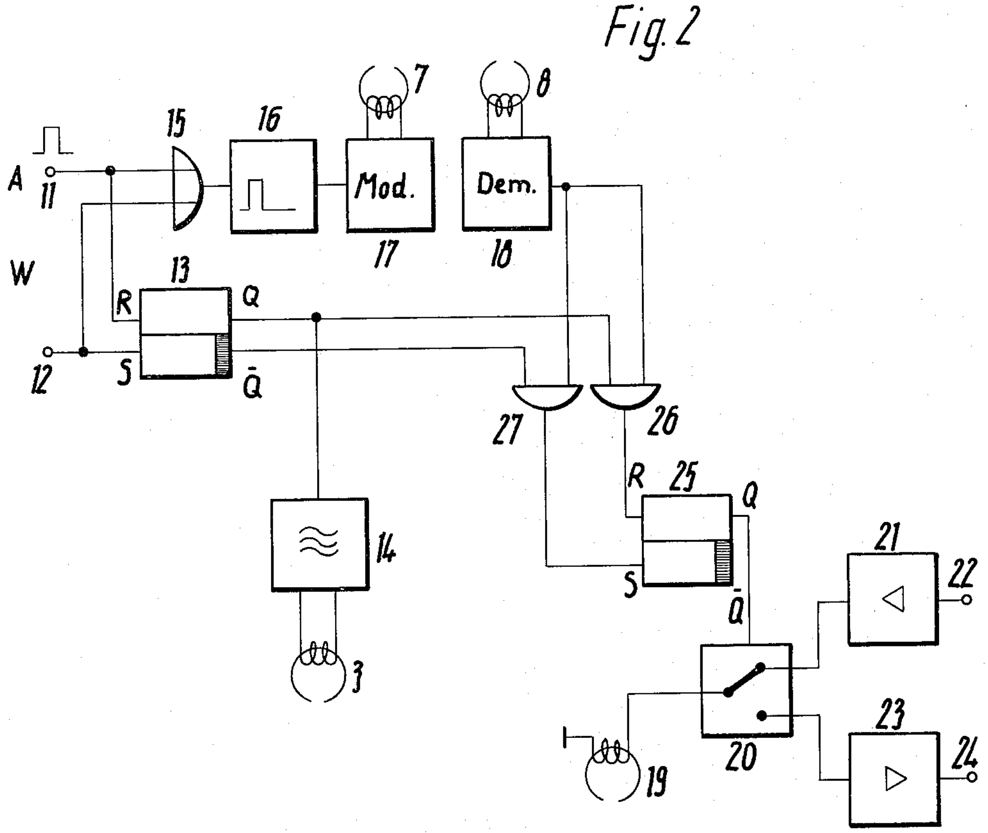
FIG. 2 is a schematic circuit diagram of one embodiment of the present invention.

FIG. 2 shows a circuit for controlling the processes described with reference to FIG. 1. In the various Figures, corresponding parts have the corresponding reference number. Further, those portions of the recording equipment which are not required for an understanding of the present invention have been omitted for purposes of clarity. The circuit of FIG. 2 has two terminals 11 and 12 for receiving, respectively, an externally applied record and an externally applied playback signal. These signals can for example constitute voltage pulses which result from the activation of a key. Terminals 11 and 12 are connected to the R and S, that is the reset and set inputs of a flip-flop 13 whose output Q is connected with an erase signal generator 14 which in turn energizes erase head 3, that is it supplies erase head 3 with the required high-frequency voltage. Thus the arrangement operates in a conventional way to energize erase head 3 upon receipt of a record signal at terminal 11. Further, conventional means are employed to assure that the signal is received at terminal 11 immediately following or shortly after a vertical synchronizing pulse of the television signal. Terminals 11 and 12 each form an input to an OR-gate 15 whose output is connected to a pulse former 16. The combination of pulse former 16 and modulator 17 serves to energize head 7, that is they furnish the proper high-frequency signal for energizing this head. For example, in a preferred embodiment of the present invention, the pulse former serves to form the voltage pulse resulting from the pressing of a key into a rectangular pulse having a predetermined pulse width. This pulse, herein referred to as a standard pulse, then serves to activate modulator 17 to furnish a high-frequency pulse train of short duration to head 7 which then records the marker signal corresponding to this pulse train.

In conventional tape recorder equipment the marker signal generated on the tape by energizing of head 7 reaches head 8 after approximately 0.6 seconds. Head 8 then furnishes a signal to demodulator 18 at whose output is furnished a pulse. The furnishing of this pulse follows the generation of the marker signal by a time interval corresponding to the time required for the point on the tape to travel from head 7 to head 8 and thus for a point to travel from erase head 3 to record/-playback heads 4.

In FIG. 2 only one head, labelled 19, of the four heads mounted on head wheel 4 is shown. The switching from head to head is accomplished conventionally, in sequence in accordance with the time that they are active in recording on the tape. This head to head switching is discussed sufficiently in the literature so that it is not discussed here since it does not increase the understanding of the present invention. In FIG. 2 a switch 20 is shown which connects head 19 either to recording circuits labelled 21 or to playback circuits labelled 23. The recording circuits 21 serve to amplify signals applied at an input terminal 22, while the playback circuits 23 serve to amplify signals derived from the head and make these available at a terminal 24. The switch operates under control of a control signal applied from the Q output of a bistable circuit, namely a flip-flop 25. Flip-flop 25 is herein referred to as storage means. The R input of flip-flop 25 is connected to the output of an AND-gate 26, herein referred to as a first AND-gate. The first input of AND-gate 26 is connected to the output of demodulator 18, while its second input is connected to the Q output of flip-flop 13. Thus if flip-flop 13 furnishes an output at its Q output, that is if a signal has previously been applied at terminal 11, then a signal will appear at the output of AND-gate 26 which will, in turn, cause a signal to appear at the Q output of flip-flop 25. This causes head 19 to be connected to the recording circuits 21. This is the position shown in the Figure.

Further, in FIG. 2, an AND-gate 27 has a first input connected to the output of demodulator 18 and a second input connected to the Q output of flip-flop 13. Thus, in response to a signal applied at terminal 12, flip-flop 13 will furnish a signal at the Q output. Upon receipt of the marker signal by head 8, AND-gate 27 will furnish an output to the set input of flip-flop 25, thereby extinguishing the control signal. Under these conditions switch 20 switches to the position not shown in the Figure wherein head 19 is connected to the playback circuits 23. Of course when flip-flop 13 is in the state wherein a Q output is furnished, erase head 3 is not energized.

The circuit described in FIG. 2 has a defect in that an error will result if, following a signal applied at one of terminals 11 and 12, a signal is applied at the other terminal after a time interval of less than 0.6 seconds. This results from the fact that at the time the marker signal is received by head 8, flip-flop 13 will be in the state corresponding to the second signal, rather than in the state corresponding to the original externally applied signal. For example let it be assumed that the equipment is first switched to the record mode by a signal applied at terminal 11. Erase head 3 will thus be energized and a marker signal will be applied by head 7 as discussed above. However, let it be assumed that before this marker signal reaches head 8, a signal is applied at terminal 12 causing flip-flop 13 to switch to the set state wherein an output is furnished at the Q output but no output is furnished at the Q output. Under these conditions AND-gate 27, rather than AND-gate 26 which should be energized, will be energized in response to the timing signal furnished by demodulator 18 upon receipt of the marker signal by head 8. Thus the equipment shown in FIG. 2 will operate satisfactorily only for scenes lasting more than 0.6 seconds.

Figure 3:
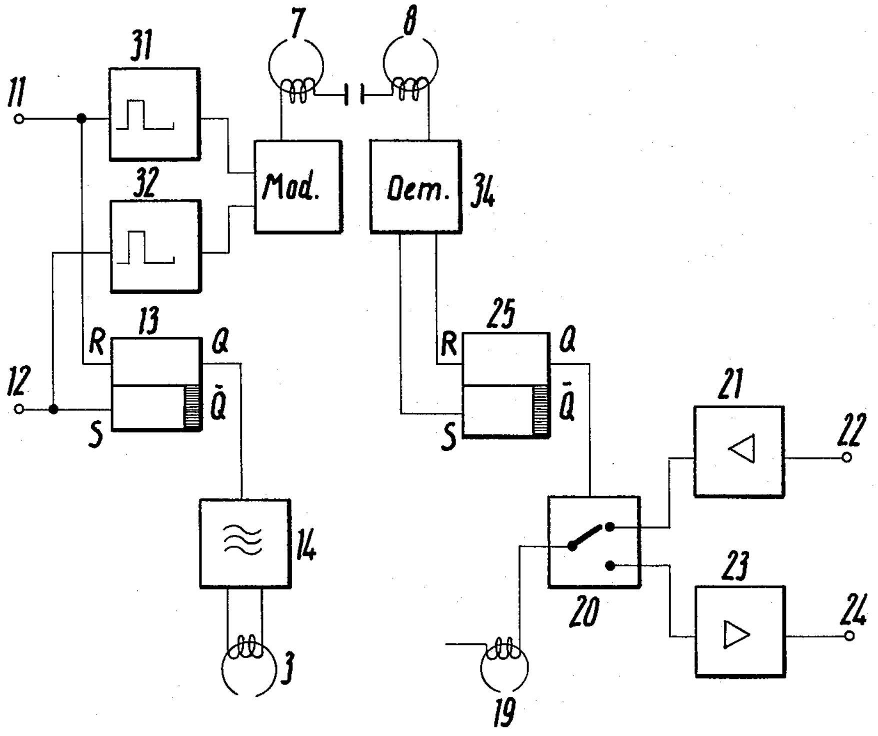
FIG. 3 is a schematic circuit diagram of a second embodiment of the present invention.

The above-mentioned scene length limitation may be eliminated by use of the circuitry shown in FIG. 3. The circuitry shown in FIG. 3 will operate satisfactorily with scenes having arbitrary short lengths, that is scenes substantially shorter than the 0.6 seconds mentioned above. Again, the reference numerals in FIG. 3 correspond to those in FIGS. 1 and 2.

It will be noted that two pulse formers, namely a pulse former 31 having an input connected to terminal 11 and a pulse former 32 having an input connected to terminal 12 are utilized in FIG. 3. The outputs of pulse formers 31 and 32 are shown as connected to two different inputs of modulator 33 whose output energizes head 7. This notation serves to indicate that modulator 33 will supply a different signal to be recorded by head 7 as a marker signal, depending upon whether the externally applied signal is a record or a playback signal. The recording of this signal can take place with conventional means, for example as a frequency multiplex signal. Correspondingly, the demodulator 34 is shown to have two outputs, namely a first output which furnishes a pulse in response to a marker signal signifying "record" and a second output furnishing a timing signal corresponding to a marker signal signifying "playback". The former is applied to the R input of flip-flop 25, while the latter is applied to the S input of flip-flop 25. As in FIG. 2, flip-flop 25 has a Q output which controls the state of switch 20. The operation of switch 20 to connect head 19 either the recording circuitry 21 or the playback circuits 23 under control of the control signal furnished at the Q output of flip-flop 25 is identical to that described relative to FIG. 2.

It is thus seen that the present invention provides for arrangements which allow cutting of video tape, independent of scene length, and cause these scenes to be recorded in a sequence whereby no gap is created on the tape.

While the invention has been illustrated and described as embodied in specific control equipment for controlling the additional heads, it is not intended to be limited to the details shown, since various circuit and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In tape recorder equipment having tape, means for transporting said tape along a predetermined path, recording circuits, playback circuits, an erase head mounted in operative proximity to said tape, and at least one record/playback head mounted at a predetermined distance along said predetermined path from said erase head, an electronic editing arrangement for switching said record/playback head from said playback circuits to said recording circuits without creating a gap in the recording on said tape in response to an externally applied record signal, comprising, in combination, additional recording means mounted in operative proximity to said tape for recording a marker signal onto said tape when energized; additional playback means mounted in operative proximity to said tape at a distance from said additional recording means corresponding to said predetermined distance, for sensing said marker signal and furnishing a timing signal in response thereto; means connected to said erase head and said additional recording means for energizing said erase head and said additional recording means substantially simultaneously in response to said externally applied record signal, thereby creating said marker signal and erasing a portion of the recording on said tape; and switch means connected to said additional playback means, said record/playback head and said recording circuits, for connecting said record/playback head to said recording circuits in response to said timing signal and under control of said externally applied record signal, whereby said record/playback head is connected to said record circuitry when the beginning of said erased portion is in operative proximity to said record/playback head.

2. Equipment as set forth in claim 1, wherein said tape recorder equipment records video signals on said tape on tracks transverse to said predetermined path; and wherein said additional recording means comprise means for recording said marker signal on a track extending along said predetermined path in the region of said transverse tracks.

3. Equipment as set forth in claim 1, wherein said tape has a main track for recording video signals within a predetermined amplitude and frequency range, and at least one auxiliary track; and wherein said marker signal is recorded on said auxiliary track by said additional recording means.

4. Equipment as set forth in claim 3, wherein signals normally recorded on said auxiliary track have a predetermined auxiliary amplitude and frequency range; and wherein said marker signal has a frequency outside of said predetermined auxiliary frequency range.

5. Equipment as set forth in claim 3, wherein signals normally recorded on said auxiliary track have a predetermined auxiliary amplitude range; and wherein said marker signal has an amplitude outside of said predetermined auxiliary amplitude range.

6. In tape recorder equipment having tape, means for transporting said tape along a predetermined path, recording circuits, playback circuits, an erase head mounted in operative proximity to said tape, and at least one record/playback head mounted at a predetermined distance along said predetermined path from said erase head, an electronic editing arrangement for connecting said record/playback head to said recording circuits or to said playback circuits in response to an externally applied record or playback signal respectively, comprising, in combination, additional recording means mounted in operative proximity to said tape for recording a marker signal on said tape when energized; additional playback means mounted in operative proximity to said tape at a distance from said additional recording means corresponding to said predetermined distance, for sensing said marker signal and furnishing a timing signal in response thereto; means connected to said erase head for energizing said erase head in response to said externally applied record signal; means connected to said additional recording means for receiving said externally applied record and playback signals and energizing said additional recording means in response thereto; and switch means connected to said record/playback head, for connecting said record/playback head to said recording circuits in response to said timing signal and under control of said externally applied record signal, and for connecting said record/- playback head to said playback circuits in response to said externally applied playback signal and under control of said timing signal.

7. Equipment as set forth in claim 6, wherein said means connected to said erase head comprise a bistable circuit means for furnishing a first signal at a first output in response to said externally applied record signal and for furnishing a second signal at a second output in response to said externally applied playback signal, and means for connecting said erase head to said first output of said bistable circuit means.

8. Equipment as set forth in claim 7, wherein said means connected to said additional recording means comprise pulse former means for furnishing at least one standard pulse having a determined pulse width and amplitude in response to said externally applied record and playback signals, and modulator means interconnected between said pulse forming means and said recording means for energizing said recording means in response to said standard pulse.

9. Equipment as set forth in claim 8, wherein said additional playback means comprise a playback head for sensing said marker signals, and demodulator means connected to said playback head for furnishing said timing signal in response to the so-sensed marker signal.

10. Equipment as set forth in claim 9, wherein said switch means comprise a first AND-gate having a first input connected to the output of said demodulator means, a second input connected to said first output of said bistale circuit means and a first AND-gate output; a second AND-gate having a first input connected to the output of said demodulator means, a second input connected to said second output of said bistable circuit means and a second AND-gate output; storage means having a first input connected to said first AND-gate output, a second input connected to said second AND-gate output, and a storage output for furnishing a control signal in response to a signal at said first AND-gate output and for extinguishing said control signal in response to a signal at said second AND-gate output; and a switching circuit for connecting said record/playback head to said recording circuitry in the presence of said control signal and to said playback circuits in the absence of said control signal.

11. Equipment as set forth in claim 9, wherein said pulse former means comprise a first pulse former for furnishing a first standard pulse in response to said externally applied record signal at a first pulse former output, and a second pulse former for furnishing a second standard pulse at a second pulse former output in response to said externally applied playback signal; wherein said modulator means have a first input connected to said first pulse former output, a second input connected to said second pulse former output, and a modulator output connected to said magnetic recording means for energizing said recording means to produce a first marker signal in response to a signal at said first pulse former output and second marker signal having a characteristic differing from said first marker signal in response to a signal at said second pulse former output.

12. Equipment as set forth in claim 11, wherein said demodulator means sense said first and second marker signals and furnish an output at a first demodulator output in response to said first marker signal and at a second demodulator output in response to said second marker signal; and wherein said switch means comprise storage means having a first input connected to said first demodulator output, a second input connected to said second demodulator output and a storage output for furnishing a control signal in response to a signal at said first storage input and for suppressing said control signal in response to a signal at said second storage input, and a switching circuit for connecting said record/-playback head to said recording circuit in response to said control signal and for connecting said record/-playback head to said playback circuit in the absence of said control signal.

* * * * *